(12) United States Patent
Gong et al.

(10) Patent No.: US 10,796,685 B2
(45) Date of Patent: Oct. 6, 2020

(54) METHOD AND DEVICE FOR IMAGE RECOGNITION

(71) Applicant: BEIJING BAIDU NETCOM SCIENCE AND TECHNOLOGY CO., LTD., Beijing (CN)

(72) Inventors: Long Gong, Beijing (CN); Yanfu Zhang, Beijing (CN); Jiawei Gu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/535,006

(22) PCT Filed: Dec. 1, 2015

(86) PCT No.: PCT/CN2015/096132
§ 371 (c)(1),
(2) Date: Jun. 9, 2017

(87) PCT Pub. No.: WO2017/041366
PCT Pub. Date: Mar. 16, 2017

(65) Prior Publication Data
US 2018/0204562 A1 Jul. 19, 2018

(30) Foreign Application Priority Data

Sep. 8, 2015 (CN) .......................... 2015 1 0567452

(51) Int. Cl.
*G06K 9/00* (2006.01)
*G10L 13/027* (2013.01)
(Continued)

(52) U.S. Cl.
CPC ........ *G10L 13/027* (2013.01); *G06K 9/00624* (2013.01); *G06K 9/00671* (2013.01);
(Continued)

(58) Field of Classification Search
None
See application file for complete search history.

(56) References Cited

U.S. PATENT DOCUMENTS 9,773,209 B1 * 9/2017 Champaneria ......... G06N 20/00
10,242,036 B2 * 3/2019 Kwon .................. G06K 9/4647
(Continued)

FOREIGN PATENT DOCUMENTS

CN 103026368 A 4/2013
CN 104281833 A 4/2015
(Continued)

*Primary Examiner* — Randolph I Chu
(74) *Attorney, Agent, or Firm* — Seed IP Law Group LLP (57) ABSTRACT

The present disclosure discloses a method and an apparatus for recognizing an image. A specific implementation of the method comprises: acquiring a to-be-recognized image containing a to-be-recognized object; sending the to-be-recognized image to a server, and receiving identification information of a target object corresponding to the to-be-recognized object returned by the server, obtained by recognizing the to-be-recognized image, and a confidence parameter returned by the server; and determining the identification information of the target object as a recognition result when the confidence parameter is greater than a confidence threshold; or acquiring labeled information associated with the to-be-recognized image from a third-party platform and determining the labeled information as the recognition result when the confidence parameter is smaller than the confidence threshold.

17 Claims, 5 Drawing Sheets

(51) Int. Cl.
*G06K 9/46* (2006.01)
*G06K 9/62* (2006.01)
*G06N 3/04* (2006.01)
*G06N 3/08* (2006.01)
*G10L 13/04* (2013.01)

(52) U.S. Cl.
CPC ......... *G06K 9/4628* (2013.01); *G06K 9/6271* (2013.01); *G06N 3/0454* (2013.01); *G06N 3/08* (2013.01); *G10L 13/043* (2013.01)

(56) References Cited

U.S. PATENT DOCUMENTS

2015/0016679 A1* 1/2015 Cao ...................... G06K 9/4642
382/103
2015/0294503 A1 10/2015 Yang et al.

FOREIGN PATENT DOCUMENTS

WO WO 2015003606 A1 * 1/2015 ......... G06K 9/00362
WO WO-2015003606 A1 * 1/2015

\* cited by examiner

METHOD AND DEVICE FOR IMAGE RECOGNITION

CROSS-REFERENCE TO RELATED APPLICATION

This present disclosure claims the benefit and priority of Chinese Patent Application No. 201510567452.2 filed on Sep. 8, 2015, the entire content of which is incorporated herein in its entirety by reference.

TECHNICAL FIELD

The present disclosure relates to the field of computers, particularly to the field of image recognition, and more particularly, to a method and an apparatus for recognizing an image.

BACKGROUND

In daily life, users may sometimes have requirements for recognizing photographed images. In the known technologies, image recognition is to recognize images using a recognition model established by analyzing features of massive images. However, when the images are recognized using the above approach, on one hand, the above approach is not suitable for personal users because larger resources are consumed in the recognition process. On the other hand, because the recognition model may only be adjusted according to a recognition result outputted by a machine, deviation may be caused to adjustment of the recognition model when more errors occur in the outputted recognition result, which may further reduce the recognition accuracy.

SUMMARY

The present disclosure provides a method and an apparatus for recognizing an image to solve the technical problem mentioned in the foregoing Background section.

In a first aspect, the present disclosure provides a method for recognizing an image. The method comprises: acquiring a to-be-recognized image containing a to-be-recognized object; sending the to-be-recognized image to a server, and receiving identification information of a target object corresponding to the to-be-recognized object returned by the server, obtained by recognizing the to-be-recognized image, and a confidence parameter returned by the server, the confidence parameter representing a probability of the to-be-recognized object being the target object; and determining the identification information of the target object as a recognition result when the confidence parameter is greater than a confidence threshold; or acquiring labeled information associated with the to-be-recognized image from a third-party platform and determining the labeled information as the recognition result when the confidence parameter is smaller than the confidence threshold.

In a second aspect, the present disclosure provides a method for recognizing an image. The method comprises: receiving a to-be-recognized image containing a to-be-recognized object sent by a client; recognizing the to-be-recognized image to obtain identification information of a target object corresponding to the to-be-recognized object and a confidence parameter, the confidence parameter representing a probability of the to-be-recognized object being the target object; and sending the identification information of the target object and the confidence parameter to the client.

In a third aspect, the present disclosure provides an apparatus for recognizing an image. The apparatus comprises: an acquiring unit, configured to acquire a to-be-recognized image containing a to-be-recognized object; an interacting unit, configured to send the to-be-recognized image to a server, and receive identification information of a target object corresponding to the to-be-recognized object returned by the server, obtained by recognizing the to-be-recognized image, and a confidence parameter returned by the server, the confidence parameter representing a probability of the to-be-recognized object being the target object; and a determining unit, configured to determine the identification information of the target object as a recognition result when the confidence parameter is greater than a confidence threshold, or acquire labeled information associated with the to-be-recognized image from a third-party platform and determine the labeled information as the recognition result when the confidence parameter is smaller than the confidence threshold.

In a fourth aspect, the present disclosure provides an apparatus for recognizing an image. The apparatus comprises: a receiving unit, configured to receive a to-be-recognized image containing a to-be-recognized object sent by a client; a recognizing unit, configured to recognize the to-be-recognized image to obtain identification information of a target object corresponding to the to-be-recognized object and a confidence parameter, the confidence parameter representing a probability of the to-be-recognized object being the target object; and a sending unit, configured to send the identification information of the target object and the confidence parameter to the client.

According to the method and apparatus for recognizing an image provided by the present disclosure, a to-be-recognized image containing a to-be-recognized object is acquired; the to-be-recognized image is sent to a server; identification information of a target object corresponding to the to-be-recognized object returned by the server, obtained by recognizing the to-be-recognized image, and a confidence parameter returned by the server are received; and the identification information of the target object is determined as a recognition result when the confidence parameter is greater than a confidence threshold; or labeled information associated with the to-be-recognized image is acquired from a third-party platform and the labeled information is determined as the recognition result when the confidence parameter is smaller than the confidence threshold. Combination of automatic recognition of a server with third-party labeled information is implemented, a recognition accuracy is enhanced, a recognition model corresponding to a machine learning recognition pattern used by the server is trained by using the third-party labeled information to enhance the training result, thereby further enhancing the recognition accuracy.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
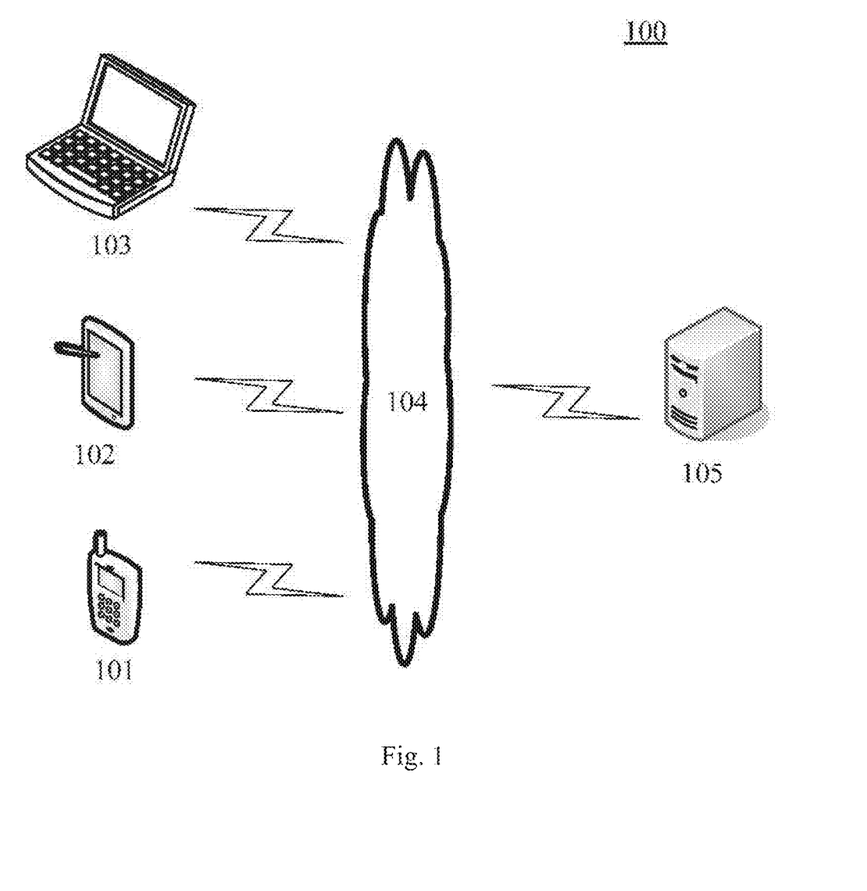
FIG. 1 is an exemplary architecture diagram of a system to which the present disclosure may be applied.

FIG. 1 shows an exemplary architecture of a system 100 which may be used by a method and apparatus for recognizing an image according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as image recognition applications and instant messaging tools, may be installed on the terminal devices 101, 102 and 103.

The terminal devices 101, 102 and 103 may be various electronic devices having display screens and supporting network communication, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be server providing various services, for example, a server in the backend providing support for image recognition applications on the terminal devices 101, 102 or 103. The backend server may perform analyzing processes on the image to be recognized, and return a processing result (target object) to the terminal devices.

It should be noted that, according to the present disclosure, the terminal acquiring the image to be recognized is called a client. A client may be the terminal devices 101, 102, 103 or the server 105, rather than being a particular type of terminal.

It should be appreciated that the numbers of the terminal devices, the networks and the servers in the virtual machine cluster in FIG. 1 are merely illustrative. Any number of terminal devices, networks and servers may be provided based on the actual requirements.

Figure 2:
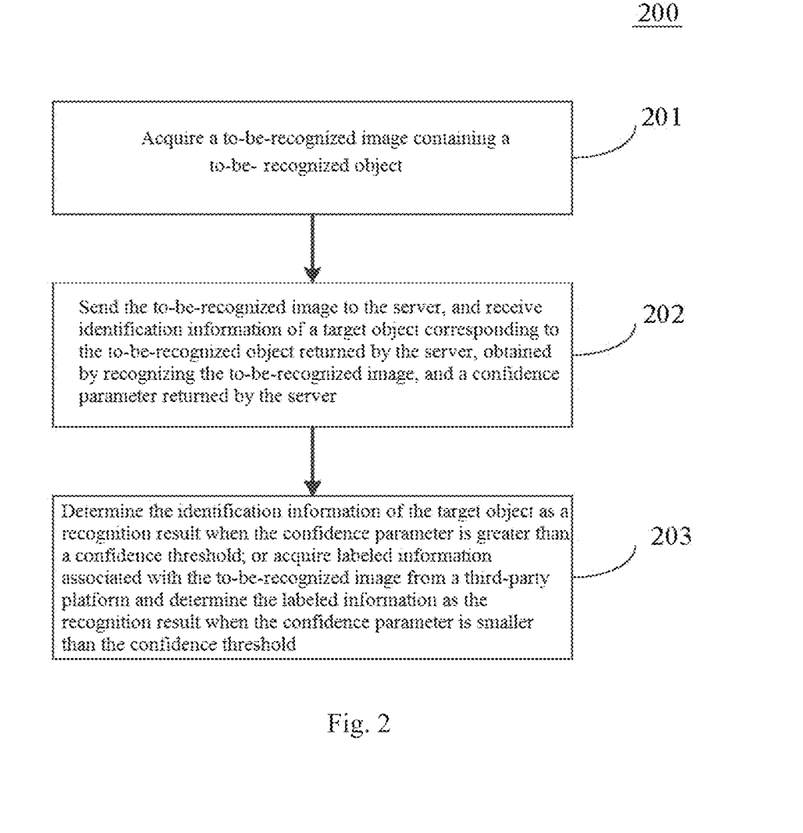
FIG. 2 illustrates a flowchart of a method for recognizing an image according to an embodiment of the present disclosure.

Referring to FIG. 2, a flow 200 of a method for recognizing an image according to an embodiment of the present disclosure is illustrated. It is to be noted that the method for recognizing an image provided by the embodiments of the present disclosure generally is performed by the terminal devices 101, 102 and 103. Correspondingly, the apparatus for recognizing an image generally is arranged in the terminal devices 101, 102 and 103. The method comprises following steps.

Step 201: acquiring a to-be-recognized image containing a to-be-recognized object.

In this embodiment, the to-be-recognized image may be captured by a camera. The camera may be arranged on the terminal device. The terminal device may comprise but is not limited to a mobile terminal or a wearable device (for example, smart glasses). Taking the smart glasses being arranged on the camera as an example, when the user wears the smart glasses, the camera may be utilized to capture an image within a viewing angle range of the camera to serve as the to-be-recognized image. In this embodiment, the camera may be started for image capture in response to inputting an image capture instruction. For example, voice information inputted by the user may be received via a microphone, the voice information is resolved to obtain the image capture instruction, and the camera is triggered for image capture. In this embodiment, the to-be-recognized image comprises a to-be-recognized object. For example, when the user enters a conference site, the camera on the wearable device worn by the user may be utilized to capture an image associated with the scene of the conference site, and the captured to-be-recognized image may comprise the to-be-recognized object such as a table or chair in the conference site.

In some optional implementations of this embodiment, the to-be-recognized object comprises at least one of: a body object, a scene object and a color object.

Step 202: sending the to-be-recognized image to the server, and receiving identification information of a target object corresponding to the to-be-recognized object returned by the server, obtained by recognizing the to-be-recognized image, and a confidence parameter returned by the server.

In this embodiment, the confidence parameter represents a probability of the to-be-recognized object being the target object.

After acquiring the to-be-recognized image, the to-be-recognized image may be sent to the server to recognize the to-be-recognized object in the image, and then the confidence parameter and the target object corresponding to the to-be-recognized object, obtained by recognizing the to-be-recognized image by the server may be received. An optional recognition pattern for recognizing the to-be-recognized image by the server is a machine learning recognition pattern. In this embodiment, the confidence parameter may be used for representing a probability of the to-be-recognized object being the target object (namely, the similarity between the to-be-recognized object and sample data of the target object) when recognizing the to-be-recognized image. The higher the value of the confidence parameter is, the larger the probability of the to-be-recognized object being the target object is.

Step 203: determining the identification information of the target object as a recognition result when the confidence parameter is greater than a confidence threshold; or acquiring labeled information associated with the to-be-recognized image from a third-party platform and determining the labeled information as the recognition result when the confidence parameter is smaller than the confidence threshold.

In this embodiment, optional labeled information comprises information containing the identification information of the target object corresponding to the to-be-recognized object, wherein the information is released by a registered user of the third-party platform. In this embodiment, after obtaining the confidence parameter returned by the server, the recognition result of the to-be-recognized image may be further determined. When the confidence parameter is greater than the confidence threshold, the identification information of the target object may be determined as the identification result. When the confidence parameter is smaller than the confidence threshold, the labeled information associated with the to-be-recognized image may be acquired from the third-party platform. Taking the to-be-recognized image including one round table and three chairs as an example, when the to-be-recognized image is recognized by means of the server in a machine recognition pattern, for example, when the to-be-recognized object is matched with the target object (namely, sample data of the round table object and the chair object), in the event that the confidence parameter is greater than the confidence threshold, identification information (namely, the table and the chairs) of the target objects (namely, table object and chair object) may be determined as the recognition result. In the event that the confidence parameter is smaller than the confidence threshold, the to-be-recognized image may be sent to the server, labeled information returned by the server may be received, and the labeled information may be determined as the recognition result.

In this embodiment, the labeled information of the to-be-recognized object may be acquired in the following ways: the to-be-recognized image may be sent to the third-party platform associated with the server, the third-party platform may provide question answering services, wherein the question answering services may be used for issuing questions asked by the user in the form of task, and the answers of the questions are published on the third-party platform by a registered user of the third-party platform. After the to-be-recognized image is sent to the third-party platform, a task for recognizing the to-be-recognized image may be generated using the question answering services of the third-party platform, and then the task is issued to the registered user of the third-party platform. When the registered user receives the task for recognizing the to-be-recognized image, an information input region may be provided when the to-be-recognized image is shown to the registered user. The registered user may determine which target objects are included in the to-be-recognized image, and then fill information such as names and number of the target objects into the information input region. In this way, the labeled information is generated. For example, when the to-be-recognized image in the task for recognizing the to-be-recognized image received by the registered user comprises one round table and three chairs, the registered user may fill information into the information input region using the following formats: round, table, one, chairs, and three. Next, the labeled information may be generated based on the information filled by the registered user. The labeled information includes identification information of the target object corresponding to the to-be-recognized object (namely, "round table and chairs"), and may further include information representing the number of the target objects (namely, "one and three").

In some optional implementations of this embodiment, the method further comprises: converting the recognition result into voice information and playing the voice information. In this implementation, after obtaining the final recognition result, the recognition result may be converted into voice information, and then the voice information is played for the user.

In some optional implementations of this embodiment, the method further comprises: sending the labeled information to the server to serve as a training sample for training a recognition model corresponding to a machine learning recognition pattern used by the server when the confidence parameter is smaller than the confidence threshold.

The application scene of this embodiment may be as below: a user (for example, a blind user) uses a camera on a wearable device to capture a to-be-recognized image (for example, a to-be-recognized image including to-be-recognized objects such as tables and chairs in a conference site) associated with the current scene (for example, the conference site). Next, the to-be-recognized image may be sent to the server to recognize the to-be-recognized image, and identification information of a target object corresponding to the to-be-recognized object and a confidence parameter which are returned by the server are received. When the confidence parameter is greater than a confidence threshold (for example, table and chair objects are accurately recognized), the identification information of the target object corresponding to the to-be-recognized object may be determined as the recognition result. When the confidence parameter is smaller than the confidence threshold, the to-be-recognized image may be sent to the third-party platform, so that the registered user of the third-party platform determines the target object (for example, the registered user determines that the to-be-recognized image includes target objects such as tables and chairs) corresponding to the to-be-recognized object, then labeled information, containing the identification information of the target object corresponding to the to-be-recognized object, returned by the third-party platform may be received, and the labeled information is determined as the recognition result. After determining the recognition result, the recognition result may be converted into voice information for playing. In this way, the user may relatively accurately learn situations of the current scene (for example, which objects are included in the scene) based on the captured image. Further, when the confidence parameter is smaller than the confidence threshold, labeled data may be sent to the server to serve as a training sample for training a recognition model corresponding to a machine learning recognition pattern used by the server to enhance a training effect of the recognition model, so that the recognition accuracy may be further enhanced in subsequent image recognition.

Figure 3:
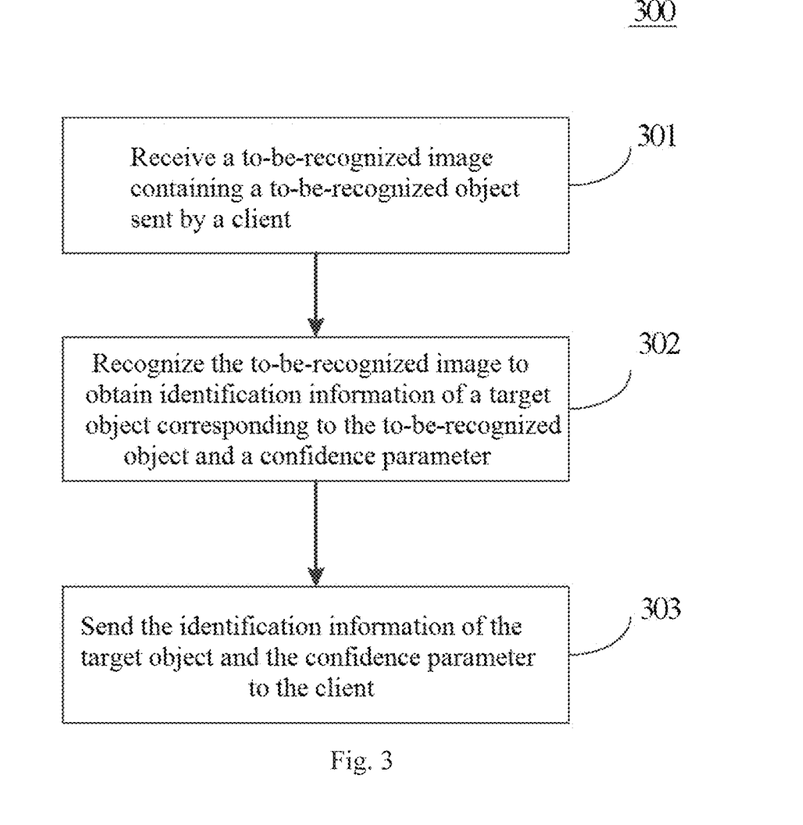
FIG. 3 illustrates a flowchart of a method for recognizing an image according to another embodiment of the present disclosure.

Referring to FIG. 3, a flow 300 of a method for recognizing an image according to an embodiment of the present disclosure is illustrated. It is to be noted that the method for recognizing an image provided by the embodiments of the present disclosure generally is performed by a server 105. Correspondingly, the apparatus for recognizing an image generally is arranged in the server 105. The method comprises following steps.

Step 301: receiving a to-be-recognized image containing a to-be-recognized object sent by a client.

In this embodiment, the to-be-recognized image comprises a to-be-recognized object. For example, when the user enters a conference site, the camera on the smart glasses may be utilized to capture an image, and the captured image may comprise the to-be-recognized object such as a table or chair.

Step 302: recognizing the to-be-recognized image to obtain identification information of a target object corresponding to the to-be-recognized object and a confidence parameter.

In this embodiment, the confidence parameter represents a probability of the to-be-recognized object being the target object. An optional implementation for recognizing the to-be-recognized object is a machine learning pattern. The machine learning pattern may include but is not limited to an auto encoder, sparse coding and deep belief networks. The machine learning pattern also may be referred to as deep learning.

In some optional implementations of this embodiment, recognizing the to-be-recognized image comprises: recognizing the to-be-recognized image using a convolutional neural network model.

In this embodiment, a recognition model corresponding to the machine learning recognition pattern used by the to-be-recognized image may be first established, and then the to-be-recognized image is recognized by using the recognition model. The principle of recognizing the to-be-recognized image using a recognition model corresponding to the machine learning pattern is outlined as below: when the to-be-recognized image is recognized using the recognition model (for example, the convolutional neural network model), the to-be-recognized object in the to-be-recognized image may be indicated by some features (for example, scale invariant feature transform feature points) to generate an input vector. After the to-be-recognized image is recognized using the recognition model, an output vector representing a target object corresponding to the to-be-recognized object may be obtained, the recognition model may be used for indicating a mapping relation from the input vector to the output vector, and then the to-be-recognized image may be recognized based on the mapping relation.

In this embodiment, when the to-be-recognized image is recognized using the recognition model, the to-be-recognized object in the to-be-recognized image may be represented by some features (for example, scale invariant feature transform feature points), features of the to-be-recognized object (for example, table object) in the to-be-recognized image may be matched with the target object (for example, sample data of the table object) to obtain the confidence parameter representing a probability of the to-be-recognized object being the target object.

In some optional implementations of this embodiment, the method further comprises: receiving a recognition result for training sent by the client, wherein the recognition result for training comprises labeled information associated with the to-be-recognized image and acquired from a third-party platform, and the labeled information comprises information containing the identification information of the target object corresponding to the to-be-recognized object, the information being released by a registered user of the third-party platform; and training, by using the recognition result for training, a recognition model corresponding to a machine learning pattern.

In this embodiment, the recognition result for training sent by the client may be labeled information associated with the to-be-recognized image acquired by the client from a third-party platform when the confidence parameter obtained by recognizing the to-be-recognized image using the machine learning pattern is smaller than the confidence threshold. The labeled information comprises information containing the identification information of the target object corresponding to the to-be-recognized object, wherein the information is released by a registered user of the third-party platform. Taking the to-be-recognized image including a round table and three chairs as an example, when the confidence parameter obtained by recognizing the to-be-recognized image using the machine learning pattern is smaller than the confidence threshold, that is, when round table or chair objects are not recognized accurately, the client may be triggered to send the to-be-recognized image to the third-party platform (for example, the third-party platform providing question answering services) to obtain labeled information of the image. The labeled information may be information containing the identification information of the target object corresponding to the to-be-recognized object, wherein the information is released by the registered user of the third-party platform. For example, the labeled information comprises "round table, one, chairs, and three".

In this embodiment, the recognition model may be trained using the labeled information. Taking the recognition model being a convolutional neural network as an example, a feature (for example, a scale invariant feature transform feature point) of the to-be-recognized image may serve as an input vector of the convolutional neural network, the labeled information may serve as an ideal output vector of the convolutional neural network, and the convolutional neural network may be trained by constituting a vector pair by the input vector and the output vector, so that the recognition model may be trained using a correct recognition result (namely, labeled information acquired by recognizing the to-be-recognized image by the registered user of the third-party platform artificially). In this way, the training effect of the recognition model is enhanced, and further the recognition accuracy is enhanced in the subsequent recognition of the to-be-recognized image.

In this embodiment, sample data corresponding to a type of the to-be-recognized object may be preset according to the type of the to-be-recognized object, and then the recognition model is trained using the sample data. For example, images of some common application scenes and labeled information of the images may be acquired in advance to serve as training data.

Step 303: sending the identification information of the target object and the confidence parameter to the client.

In this embodiment, after recognizing the to-be-recognized image, the identification information of the target object corresponding to the to-be-recognized object in the to-be-recognized image and the obtained confidence parameter may be sent to the client.

Figure 4:
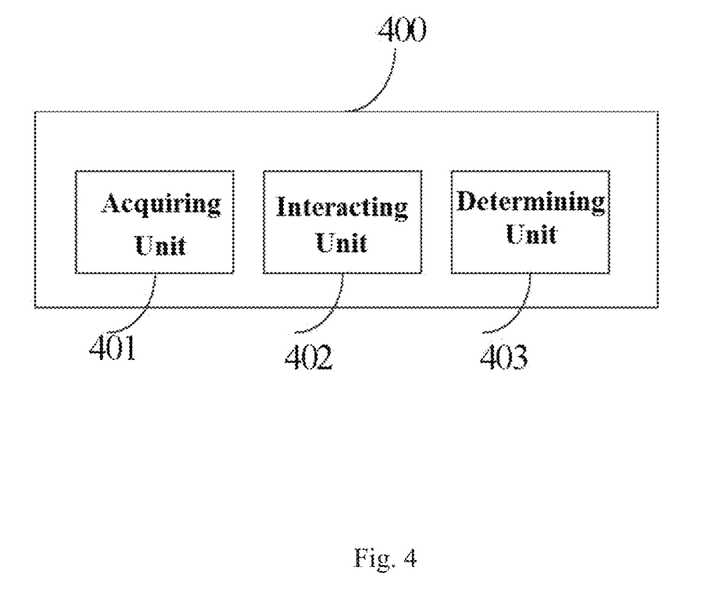
FIG. 4 illustrates a schematic structural diagram of an apparatus for recognizing an image according to an embodiment of the present disclosure.

Referring to FIG. 4, a schematic structural diagram of an apparatus for recognizing an image according to an embodiment of the present disclosure is illustrated. The apparatus 400 comprises: an acquiring unit 401, an interacting unit 402 and a determining unit 403. The acquiring unit 401 is configured to acquire a to-be-recognized image containing a to-be-recognized object. The interacting unit 402 is configured to send the to-be-recognized image to a server, and receive identification information of a target object corresponding to the to-be-recognized object returned by the server, obtained by recognizing the to-be-recognized image, and a confidence parameter returned by the server, the confidence parameter representing a probability of the to-be-recognized object being the target object. The determining unit 403 is configured to determine the identification information of the target object as a recognition result when the confidence parameter is greater than a confidence threshold, or acquire labeled information associated with the to-be-recognized image from a third-party platform and determine the labeled information as the recognition result when the confidence parameter is smaller than the confidence threshold.

In some optional implementations of this embodiment, the labeled information comprises information containing the identification information of the target object corresponding to the to-be-recognized object, the information being released by a registered user of the third-party platform.

In some optional implementations of this embodiment, the apparatus 400 further comprises: a playing unit (not shown), configured to convert the recognition result into voice information and play the voice information.

In some optional implementations of this embodiment, the apparatus 400 further comprises: a labeled information sending unit (not shown), configured to send the labeled information to the server to serve as a training sample for training a recognition model corresponding to a machine learning recognition pattern used by the server when the confidence parameter is smaller than the confidence threshold.

In some optional implementations of this embodiment, the to-be-recognized object comprises at least one of: a body object, a scene object and a color object.

Figure 5:
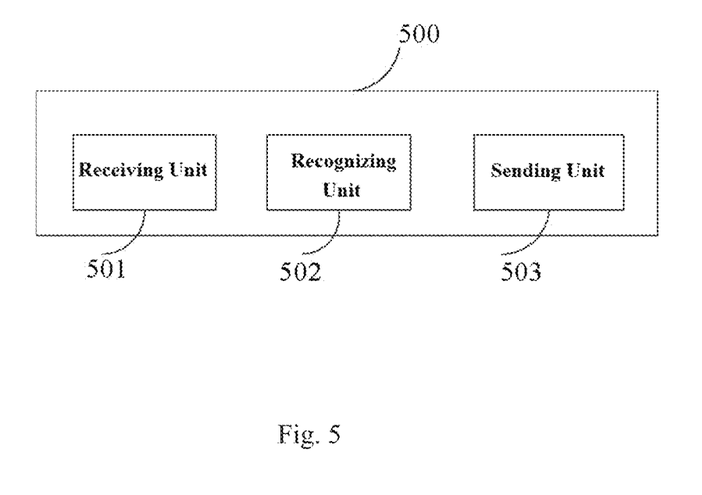
FIG. 5 illustrates a schematic structural diagram of an apparatus for recognizing an image according to another embodiment of the present disclosure.

Referring to FIG. 5, a schematic structural diagram of an apparatus for recognizing an image according to another embodiment of the present disclosure is illustrated. The apparatus 500 comprises: a receiving unit 501, a recognizing unit 502 and a sending unit 503. The receiving unit 501 is configured to receive a to-be-recognized image containing a to-be-recognized object sent by a client. The recognizing unit 502 is configured to recognize the to-be-recognized image to obtain identification information of a target object corresponding to the to-be-recognized object and a confidence parameter, the confidence parameter representing a probability of the to-be-recognized object being the target object. The sending unit 503 is configured to send the identification information of the target object and the confidence parameter to the client.

In some optional implementations of this embodiment, the recognizing unit 502 comprises: a neural network sub-unit (not shown), configured to recognize the to-be-recognized image using a convolutional neural network model.

In some optional implementations of this embodiment, the apparatus 500 further comprises: a recognition result receiving unit (not shown), configured to receive a recognition result for training sent by the client, wherein the recognition result for training comprises labeled information associated with the to-be-recognized image and acquired from a third-party platform, and the labeled information comprises information containing the identification information of the target object corresponding to the to-be-recognized object, the information being released by a registered user of the third-party platform; and a training unit (not shown), configured to train, using the recognition result for training, a recognition model corresponding to a machine learning recognition pattern.

Figure 6:
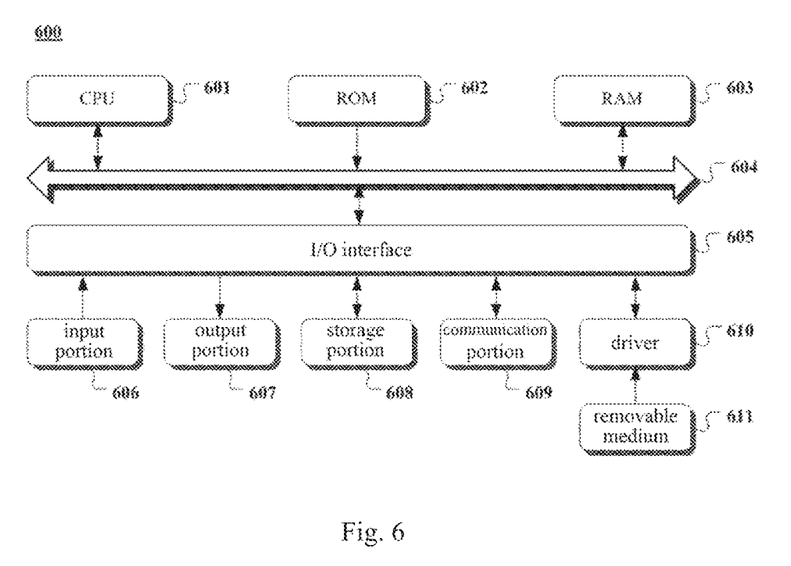
FIG. 6 illustrates a structural schematic diagram of a computer system adapted to implement a terminal device or a server of the embodiments of the present disclosure.

Referring to FIG. 6, a schematic structural diagram of a computer system 600 adapted to implement a terminal apparatus or a server of the embodiments of the present disclosure is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present disclosure may be implemented by way of software or hardware. The described units or modules may also be provided in a processor, for example, described as: a processor, comprising an acquiring unit, a receiving unit and a processing unit, where the names of these units are not considered as a limitation to the units. For example, the acquiring unit may also be described as "a unit for acquiring a to-be-recognized image containing a to-be-recognized object".

In another aspect, the present disclosure further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquire a to-be-recognized image containing a to-be-recognized object; send the to-be-recognized image to a server, and receive identification information of a target object corresponding to the to-be-recognized object returned by the server, obtained by recognizing the to-be-recognized image, and a confidence parameter returned by the server, wherein the confidence parameter represents a probability of the to-be-recognized object being the target object; and determine the identification information of the target object as a recognition result when the confidence parameter is greater than a confidence threshold; or acquire labeled information associated with the to-be-recognized image from a third-party platform and determine the labeled information as the recognition result when the confidence parameter is smaller than the confidence threshold. The non-volatile computer storage medium stores one or more programs. The one or more programs, when executed by a device, cause the device to: receive a to-be-recognized image containing a to-be-recognized object sent by a client; recognize the to-be-recognized image to obtain identification information of a target object corresponding to the to-be-recognized object and a confidence parameter, wherein the confidence parameter represents a probability of the to-be-recognized object being the target object; and send the identification information of the target object and the confidence parameter to the client.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for recognizing an image applied to a user terminal comprising:
   acquiring a to-be-recognized image containing a to-be-recognized object;
   sending the to-be-recognized image from the user terminal to a server, and receiving identification information of a target object corresponding to the to-be-recognized object returned by the server, obtained by recognizing the to-be-recognized image using a convolutional neural network model, and a confidence parameter returned by the server, the confidence parameter representing a probability of the to-be-recognized object being the target object; and
   in response to the confidence parameter returned by the server being smaller than the confidence threshold, sending the to-be-recognized image from the user terminal to a third-party platform providing question answering services and associated with the server, acquiring manually labeled information associated with the to-be-recognized image from the third-party platform, and determining the manually labeled information as the recognition result, wherein the manually labeled information includes information released by a registered user of the third-party platform.

2. The method according to claim 1, wherein the manually labeled information comprises information containing the identification information of the target object corresponding to the to-be-recognized object.

3. The method according to claim 2, further comprising: converting the recognition result into voice information and playing the voice information.

4. The method according to claim 1, further comprising: sending the manually labeled information to the server to serve as a training sample for training a recognition model corresponding to a machine learning recognition pattern used by the server when the confidence parameter is smaller than the confidence threshold.

5. The method according to claim 1, wherein the to-be-recognized object comprises at least one of: a body object, a scene object and a color object.

6. A method for recognizing an image, applied to a server, comprising:
   receiving a to-be-recognized image containing a to-be-recognized object sent by a client;
   recognizing the to-be-recognized image to obtain identification information of a target object corresponding to the to-be-recognized object and a confidence parameter, the confidence parameter representing a probability of the to-be-recognized object being the target object; and
   sending the identification information of the target object and the confidence parameter to the client, for the client to send the to-be-recognized image from the client to a third-party platform providing question answering services and associated with the server in response to the confidence parameter returned by the server being smaller than the confidence threshold, and determine, based on the confidence parameter, whether to use manually labeled information associated with the to-be-recognized image acquired from the third-party platform as the recognition result, wherein the manually labeled information includes information released by a registered user of the third-party platform,
   wherein the recognizing the to-be-recognized image comprises recognizing the to-be-recognized image using a convolutional neural network model.

7. The method according to claim 6, further comprising:
   receiving a recognition result for training sent by the client, the recognition result for training comprising manually labeled information associated with the to-be-recognized image and acquired from a third-party platform, the manually labeled information comprising information containing the identification information of the target object corresponding to the to-be-recognized object; and
   training, by using the recognition result for training, a recognition model corresponding to a machine learning recognition pattern used for recognizing the to-be-recognized image.

8. A device, comprising:
   a processor; and
   a memory,
   the memory storing a computer-readable instruction that can be executed by the processor, and when the computer-readable instruction being executed, the processor performing operations, the operations comprising:
   acquiring a to-be-recognized image containing a to-be-recognized object;

sending the to-be-recognized image from the user terminal to a server, and receiving identification information of a target object corresponding to the to-be-recognized object returned by the server, obtained by recognizing the to-be-recognized image using a convolutional neural network model and a confidence parameter returned by the server, the confidence parameter representing a probability of the to-be-recognized object being the target object; and in response to the confidence parameter returned by the server being smaller than the confidence threshold, sending the to-be-recognized image from the user terminal to a third-party platform providing question answering services and associated with the server, acquiring manually labeled information associated with the to-be-recognized image from the third-party platform, and determining the manually labeled information as the recognition result.

9. A non-volatile computer storage medium, storing computer-readable instructions that can be executed by a processor, and when the computer-readable instructions are executed by the processor, the processor performs the method according to claim 1.

10. The device according to claim 8, wherein the manually labeled information comprises information containing the identification information of the target object corresponding to the to-be-recognized object.

11. The device according to claim 10, the operations further comprising: converting the recognition result into voice information and playing the voice information.

12. The device according to claim 8, the operations further comprising: sending the manually labeled information to the server to serve as a training sample for training a recognition model corresponding to a machine learning recognition pattern used by the server when the confidence parameter is smaller than the confidence threshold.

13. The device according to claim 8, wherein the to-be-recognized object comprises at least one of: a body object, a scene object and a color object.

14. A device, comprising:
a processor; and
a memory,
the memory storing a computer-readable instruction that can be executed by the processor, and when the computer-readable instruction being executed, the processor performing operations, the operations comprising:
receiving a to-be-recognized image containing a to-be-recognized object sent by a client;
recognizing the to-be-recognized image to obtain identification information of a target object corresponding to the to-be-recognized object and a confidence parameter, the confidence parameter representing a probability of the to-be-recognized object being the target object; and
sending the identification information of the target object and the confidence parameter to the client, for the client to send the to-be-recognized image from the client to a third-party platform providing question answering services and associated with the server in response to the confidence parameter returned by the server being smaller than the confidence threshold, and determine, based on the confidence parameter, whether to use manually labeled information associated with the to-be-recognized image acquired from the third-party platform as the recognition result, wherein the manually labeled information includes information released by a registered user of the third-party platform,
wherein the recognizing the to-be-recognized image comprises recognizing the to-be-recognized image using a convolutional neural network model.

15. The device according to claim 14, the operations further comprising:
receiving a recognition result for training sent by the client, the recognition result for training comprising manually labeled information associated with the to-be-recognized image and acquired from a third-party platform associated with the server, the manually labeled information comprising information containing the identification information of the target object corresponding to the to-be-recognized object; and
training, by using the recognition result for training, a recognition model corresponding to a machine learning recognition pattern used for recognizing the to-be-recognized image.

16. A non-volatile computer storage medium, storing a computer-readable instructions that can be executed by a processor, and when the computer-readable instructions are executed by the processor, the processor performs operations, the operations comprising:
receiving a to-be-recognized image containing a to-be-recognized object sent by a client;
recognizing the to-be-recognized image to obtain identification information of a target object corresponding to the to-be-recognized object and a confidence parameter, the confidence parameter representing a probability of the to-be-recognized object being the target object; and
sending the identification information of the target object and the confidence parameter to the client, for the client to: send the to-be-recognized image from the client to a third-party platform providing question answering services and associated with the server in response to the confidence parameter returned by the server being smaller than the confidence threshold, and determine, based on the confidence parameter, whether to use manually labeled information associated with the to-be-recognized image acquired from a third-party platform providing question answering services and associated with the server as the recognition result, wherein the manually labeled information includes information released by a registered user of the third-party platform,
wherein the recognizing the to-be-recognized image comprises recognizing the to-be-recognized image using a convolutional neural network model.

17. The non-volatile computer storage medium according to claim 16, the operations further comprising:
receiving a recognition result for training sent by the client, the recognition result for training comprising the manually labeled information associated with the to-be-recognized image and acquired from the third-party platform associated with the server, the manually labeled information comprising information containing the identification information of the target object corresponding to the to-be-recognized object, the information being released by a registered user of the third-party platform; and
training, by using the recognition result for training, a recognition model corresponding to a machine learning recognition pattern used for recognizing the to-be-recognized image.

* * * * *